US006027025A

United States Patent [19]

Postrel et al.

[11] Patent Number: 6,027,025

[45] Date of Patent: Feb. 22, 2000

[54] CURRENCY STORAGE AND DISPENSING APPARATUS

[75] Inventors: Richard D. Postrel, Miami Beach, Fla.; Steven J. Shiozaki, Belmont, Calif.; Edward H. Empson, San Jose, Calif.; Kenneth R. Haven, Fremont, Calif.

[73] Assignee: Skyteller, L.L.C., Englewood, Colo.

[21] Appl. No.: 09/045,513

[22] Filed: Mar. 20, 1998

[51] Int. Cl.[7] .................... G06K 7/00

[52] U.S. Cl. .................... 235/486; 235/22; 206/565; 221/197; 902/13; 902/14

[58] Field of Search .................... 235/7 R, 10, 22, 235/379, 475, 486; 902/8, 9, 13, 14, 15; 206/215, 449, 560, 565; 221/155, 197, 232

[56] References Cited

U.S. PATENT DOCUMENTS

| | | | |
|---|---|---|---|
| 4,106,667 | 8/1978 | Lynott | 221/1 |
| 4,310,885 | 1/1982 | Azcua et al. | 364/405 |
| 4,325,494 | 4/1982 | Fish | 221/13 |
| 4,337,864 | 7/1982 | McLean | 209/534 |
| 4,365,700 | 12/1982 | Arimoto et al. | 194/2 |
| 4,436,182 | 3/1984 | Simonotti et al. | 186/37 |
| 4,438,704 | 3/1984 | Hutcheon | 109/44 |
| 4,441,160 | 4/1984 | Azcua et al. | 364/900 |
| 4,578,009 | 3/1986 | Granzow et al. | 414/43 |
| 4,585,145 | 4/1986 | Pitroda | 221/58 |
| 4,655,391 | 4/1987 | Granzow et al. | 232/43.1 |
| 4,664,417 | 5/1987 | Rosenstrach et al. | 283/1 B |
| 4,669,393 | 6/1987 | Wührich | 109/48 |
| 4,704,061 | 11/1987 | Peebles | 414/405 |
| 4,816,652 | 3/1989 | Wildgoose et al. | 235/379 |
| 4,889,240 | 12/1989 | Sato et al. | 209/534 |
| 4,890,824 | 1/1990 | Uchida et al. | 271/3.1 |
| 4,953,086 | 8/1990 | Fukatsu | 364/408 |
| 4,962,919 | 10/1990 | Azuchi et al. | 271/3.1 |
| 4,977,994 | 12/1990 | Adachi et al. | 194/210 |
| 5,036,779 | 8/1991 | Capraro | 109/24.1 |
| 5,105,364 | 4/1992 | Kawamura et al. | 364/478 |
| 5,110,105 | 5/1992 | Nicoll et al. | 271/5 |
| 5,209,335 | 5/1993 | Shuren et al. | 194/200 |
| 5,209,395 | 5/1993 | Zouzoulas et al. | 232/15 |
| 5,251,738 | 10/1993 | Dabrowski | 194/206 |
| 5,285,926 | 2/1994 | Falk et al. | 221/2 |
| 5,299,511 | 4/1994 | Dallman et al. | 109/24.1 |
| 5,405,131 | 4/1995 | Zouzoulas | 271/181 |
| 5,411,249 | 5/1995 | Zouzoulas | 271/181 |
| 5,553,320 | 9/1996 | Matsuura et al. | 235/379 |
| 5,649,696 | 7/1997 | Yamada | 271/3.14 |
| 5,670,768 | 9/1997 | Modiano et al. | 239/379 |

FOREIGN PATENT DOCUMENTS

| | | | |
|---|---|---|---|
| 0744717A2 | 11/1996 | European Pat. Off. | G07D 11/00 |
| 2079832A | 1/1982 | United Kingdom | E05B 39/00 |
| 2182717A | 5/1987 | United Kingdom | E05G 5/00 |
| WO9202903 | 2/1992 | WIPO | G07D 13/00 |
| WO9704426 | 2/1997 | WIPO | G07F 7/04 |

OTHER PUBLICATIONS

International Search Report, PCT/US 99/05369; Aug. 3, 1999; 3 pages.

*Primary Examiner*—Michael G Lee
*Assistant Examiner*—Jared J. Fureman
*Attorney, Agent, or Firm*—Sidley & Austin

[57] ABSTRACT

A currency storage and dispensing apparatus (20) includes a top member (22) defining an upper interior cavity (34), a bottom member (36) defining a lower interior cavity (48), and a slider (64). The top member and the bottom member can be connected to define a storage cavity (49) for the secure storage of a quantity of currency (58). A display notch (80) is formed through a corner of the top member allowing a corner of the currency stored within the apparatus to be exposed. An angled dispensing slot (82) is formed through the upper wall of the top member and intersects with the display notch such that single currency bills can be dispensed through the slot. A currency storage drawer (100) is also provided in which a plurality of bill dispensing units (102) can be secured by a rod (106).

17 Claims, 4 Drawing Sheets

20 22 24 26 28 30 32 36 38 40 42 44 46 49 50 52 54 56 58 60 64 70 72 76 80 82 84 86 88 90 92 94 96 104 108 110 118
w
h
a

CURRENCY STORAGE AND DISPENSING APPARATUS

TECHNICAL FIELD OF THE INVENTION

This invention generally relates to the storage and manual dispensing of currency and similar laminar objects. In one aspect, it relates to an apparatus for securely storing a quantity of currency and facilitating the manual dispensing of single bills.

BACKGROUND OF THE INVENTION

Although an increasing number of financial transactions are being automated through the use of automatic teller machines (ATMs) and similar technology, the majority of cash transactions still involve a human cashier, sales clerk or other attendant who manually dispenses currency from a secure storage device. The storage device is typically a lockable cash drawer, also known as a till, associated with a cash register or similar sales terminal. The till traditionally has one or more fixed vertical separators which divide the storage compartment into subsections. Each of the subsections can accommodate a horizontal stack of currency (i.e., the front or back of each bill faces upward). Different denominations of currency, checks or other such laminar objects are stored in each stack. Single bills can be manually dispensed from the till by sliding them from the top of the stack.

The traditional till has several deficiencies with respect to the efficient storage and manual dispensing of currency. First, since currency in a manual till is seldom stored in stacks of bills more than about one-half inch (½") thick, the horizontal orientation of the currency being stored requires a relatively large horizontal till area (also known as footprint) per unit volume of stored currency. This greatly reduces the number of different currency denominations which can be separately managed in a till having a given footprint. Certain business activities, for example, currency exchange, can require a large number of different currencies to be available in several denominations each. In such cases, storing the currency in horizontal stacks requires a storage drawer with a very large footprint. This is especially problematic when the currency exchange activity is being conducted with a portable point of sale device, such as on an airplane or other transportation means. A need therefore exists, for a currency storage and manual dispensing apparatus that can store currency in an orientation requiring less horizontal till area per unit volume of stored currency than horizontal storage.

Second, the fixed dividers of a traditional till make it difficult to accommodate currencies having different lengths and widths. This is especially true when the currencies of different countries must be kept in a single till. Custom made tills can be produced to accommodate various sized currencies, but only if the sizes are known in advance. Even tills having movable dividers are typically adjustable only for currency width, rather than for both width and length. A need therefore exists, for a currency storage and manual dispensing apparatus which can be readily adjusted to accommodate currencies of different lengths and widths.

Third, while single bills can be manually dispensed from a conventional till with relative ease, the currency in a conventional till can also be readily pilfered (i.e., stolen) by dishonest bystanders if the cashier or attendant is momentarily distracted. The dishonest person can simply reach into the till and grab one or more entire stacks of currency in a single motion. This security issue is of particular concern in crowded settings such as in aircraft aisles, at sporting events, outdoor concerts and the like. A need therefore exists, for a currency storage and manual dispensing apparatus which allows efficient manual dispensing of stored currency but which prevents pilfering of the stored contents.

SUMMARY OF THE INVENTION

A currency storage and dispensing apparatus is provided having a top member with upper wall, end walls and side walls defining an upper interior cavity, a bottom member having a lower wall, end walls and side walls defining a lower interior cavity, and a slider member having a horizontal portion and a vertical portion. The top member and the bottom member are connected together such that the upper wall, lower wall, end walls and side walls define an interior storage cavity for the storage of a quantity of currency. A display notch is formed at an upper corner of the apparatus such that a corner of the currency stored in the storage cavity is exposed. An angled dispensing slot is formed through the upper wall intersecting the display notch. Single bills can be manually dispensed from the currency in the storage cavity by pushing the bills through the dispensing slot.

In another embodiment, the points of connection between the top member and the bottom member can be selected to adjust the vertical height of the internal storage cavity. In yet another embodiment, the slider can be moved horizontally to adjust the horizontal width of the internal storage cavity.

In another aspect of the current invention, a storage drawer is provided including a plurality of bill dispensing units (BDU) mounted therein. In one embodiment, the bill dispensing units are mounted using a security bar which passes through openings formed through each BDU in a region outside the storage cavity. In another embodiment, the BDUs include a presentation tab positioned horizontally on the opposite side of the security bar from the display notch such that a downward force on the presentation tab will cause the BDU to rotate upwards such that the user has improved access to the exposed currency in the display notch.

BRIEF DESCRIPTION OF THE DRAWINGS

A better and more complete understanding of the present invention and the advantages thereof will be gained from the following detailed description, claims, and accompanying drawings in which:

DETAILED DESCRIPTION OF THE INVENTION

Figure 1:
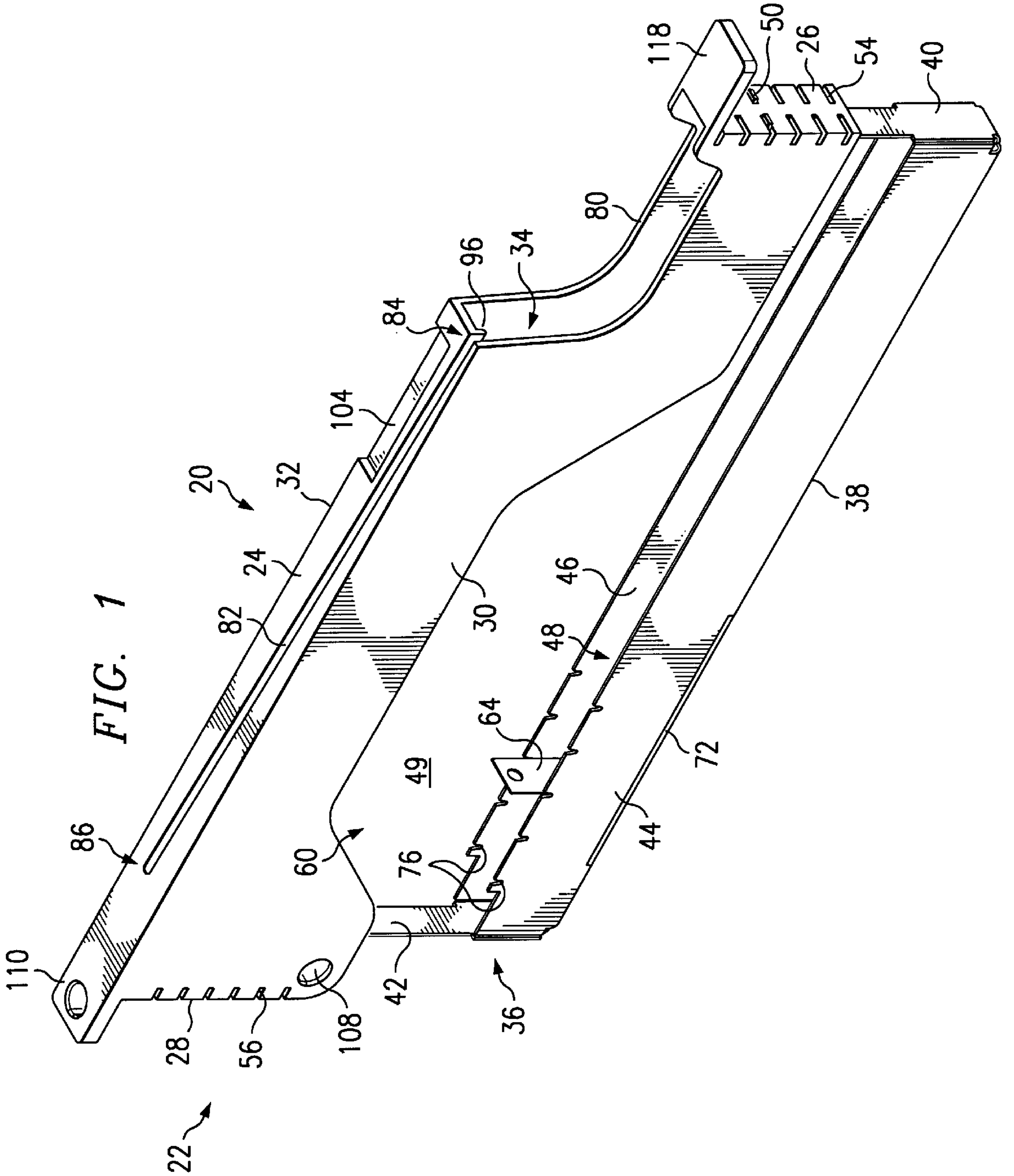
FIG. 1 is a perspective view of a currency storage and dispensing apparatus according to one aspect of the current invention.

With reference to the accompanying FIGS. 1–4, wherein like reference numerals designate like or corresponding parts throughout the several views, the present invention is explained hereafter.

FIGS. 1, 2*a*–2*e* and 3 illustrate a currency storage and dispensing apparatus 20 according to the preferred embodiment of the current invention. The currency storage and dispensing apparatus 20 is also known as a bill dispensing unit (hereafter abbreviated "BDU") and it will be understood that the terms "currency storage and dispensing apparatus", "bill dispensing unit", and "BDU" will be used interchangeably throughout this application. BDU 20 includes a top member 22 having a generally rectangular upper wall 24 connected to end walls 26, 28 and to side walls 30, 32 to define an upper interior cavity 34 therebetween. BDU 20 further includes a bottom member 36 having a generally rectangular lower wall 38 connected to end walls 40, 42 and to side walls 44, 46 to define a lower interior cavity 48 therebetween.

The top member 22 and the bottom member 36 are connected to one another such that the interior surfaces of the top, bottom, end and side walls of members 22 and 36 define the boundaries of a generally rectangular storage cavity 49 for the storage of currency. As seen in FIG. 1, when the top member 22 and the bottom member 36 are connected, storage cavity 49 is defined by upper wall 24, lower wall 38, end walls 26, 28, 40 and 42, and side walls 30, 32, 44 and 46 with upper cavity 34 at the upper end and lower cavity 48 at the lower end.

Note that it is not necessary for the walls of BDU 20 which define storage cavity 49 to be continuous, rather they need only be large enough to support currency 58 such that it does not fall out of BDU 20. For example, while a large open area, designated by reference numeral 60 in FIG. 2*a*, remains between the upper side walls 30, 32 and the lower side walls 44, 46, there is little chance that currency 58 will fall through this open area if the vertical height h of storage cavity 49 is selected to keep the top of currency 58 in the upper cavity 34. If an extra margin of safety is required, however, for example when very high value currency is being carried, a side wall insert 62 (FIG. 3) can be inserted into the interior cavity 48 of bottom member 36 before it is assembled with top member 22. The optional insert 62 can be made of any stiff material, for example, paper, plastic and thin metal, however it is preferred that insert 62 be formed of a clear material such that the contents of the BDU can be seen through the open area 60 for content verification purposes.

It is desirable, although not required, that the point of connection between upper member 22 and lower member 36 be selectable within a range of positions such that the vertical height dimension h (FIG. 2*a*) of the storage cavity 49 can be selected to accommodate currencies having different heights. In the preferred embodiment, the bottom member 36 is connected to the top member 22 by prongs 50, 52 formed on end walls 40,42, respectively, of bottom member 36 which interfit into slots 54, 56 formed in end walls 26, 28, respectively, of top member 22. As best seen in FIG. 3, the bottom member end walls, 40, 42 include flexible sections, 41, 43, respectively, which can flex to allow prongs 50, 52 to be withdrawn from one set of slots 54 or 56 and inserted to a different set of slots 54 or 56 so as to adjust the overall distance between the inner surface of upper wall 24 and the inner surface of lower wall 38.

Figures 2A, 2B, 2C, 2D, 2E:
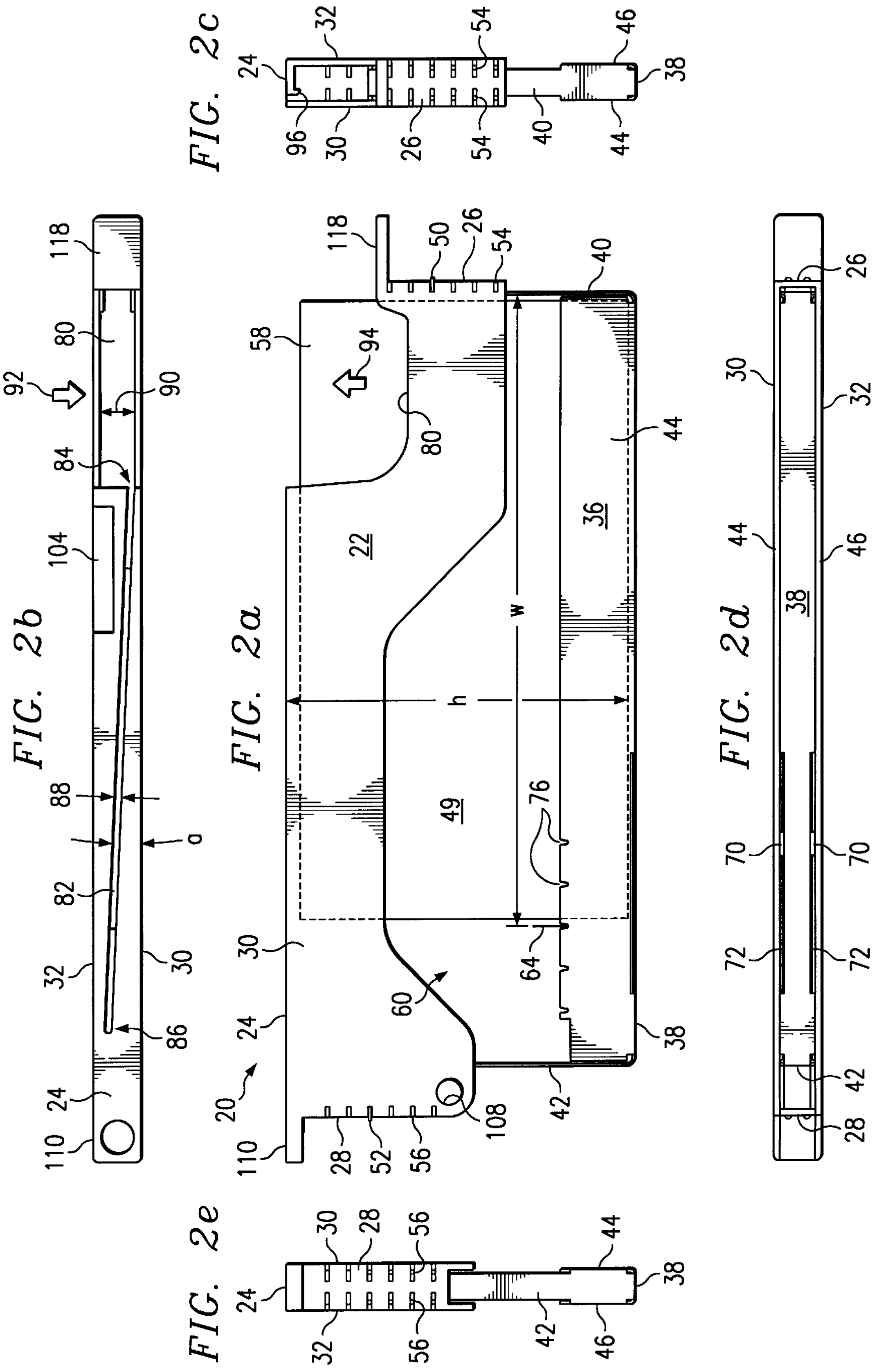
FIG. 2*a* is a side view of the apparatus of FIG. 1 showing the position of currency stored therein.
FIG. 2*b* is a top view thereof.
FIG. 2*c* is an end view thereof facing the dispensing end.
FIG. 2*d* is a bottom view thereof.
FIG. 2*e* is an opposite end view thereof facing the non-dispensing end.
Figure 3:
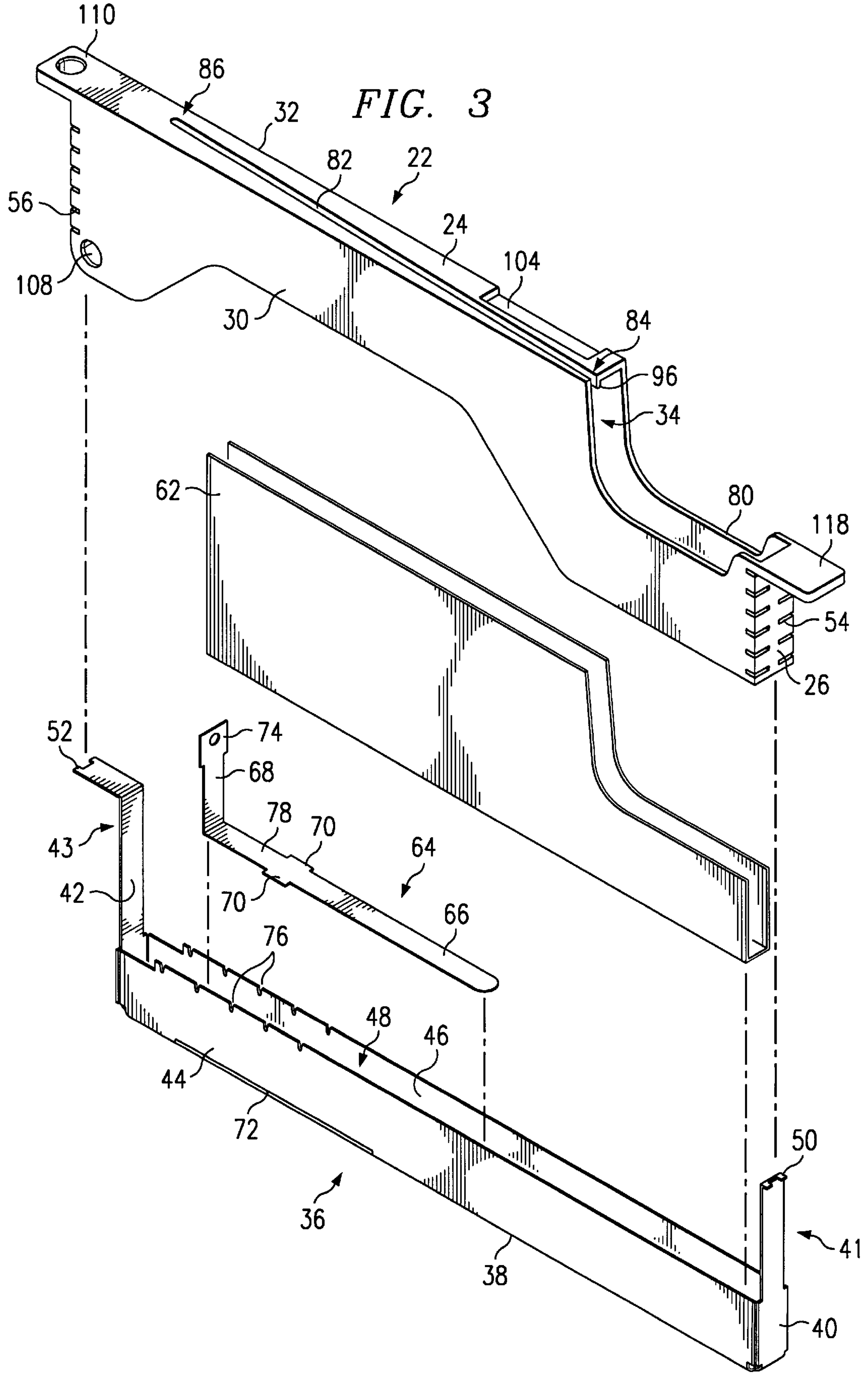
FIG. 3 is an exploded perspective view of the apparatus of FIG. 1 showing the constituent parts.

Referring now also to FIG. 2*a*, a quantity of currency 58 or similar laminar objects can be placed in the internal cavity 49 by detaching top member 22 from bottom member 36, inserting a quantity of bills, and then re-attaching the top and bottom members to one another.

It is desirable, although not required, that a means be provided for the adjustment of the horizontal width w (FIG. 2*a*) of storage cavity 49. In the preferred embodiment, a slider 64 having a horizontal portion 66 and a vertical portion 68 is installed in bottom member 36 to allow for the adjustment of horizontal width w of storage cavity 49. In the preferred embodiment, slider 64 is mounted to bottom member 36 by fitting mounting tabs 70 into horizontal slots 72 formed through side walls 44, 46 of bottom member 36 adjacent to lower wall 38. Vertical portion 68 is equipped with a locking tab 74 on the vertical portion 68 which fits into notches 76 formed in side walls 44, 46 of bottom member 36 so as to maintain the desired position of slider 64. To adjust the width w of the storage cavity 49, the locking tab is pulled vertically upward causing a flexible portion 78 of the slider 64 to flex such that locking tab 74 can be raised from engagement with notches 76. The entire slider 64 can then be moved horizontally until the desired width is obtained, then locking tab 74 can be allowed to engage a new set of notches 76 under the urging provided by flexible portion 78.

To allow the manual dispensing of currency from the storage cavity 49 of BDU 20, a display notch 80 is formed at an upper corner of the BDU by terminating a portion of the upper wall 24, side walls 30, 32 and end wall 26 such that a corner of the currency 58 (FIG. 2*a*) stored in storage cavity 49 extends from within the BDU so that an attendant can touch the exposed corner of the bills. Display notch 80 must be large enough such that the attendant can firmly grasp the corner of the currency stack. In the preferred embodiment, the display notch 80 has a vertical height (measured from the notch edge to a line constituting a horizontal extension of upper wall 24) of about one inch and a horizontal width (measured horizontally from the notch edge to a line constituting a vertical extension of end wall 26) of about two inches.

A dispensing slot 82 is formed through the upper wall 24 to join the storage cavity 49 and the display notch 80. Viewed from above (as best seen in FIG. 2*b*), dispensing slot 82 joins display notch 80 at a position flush with the rear surface of the front side wall 30 in the area designated by reference numeral 84. The dispensing slot 82 then proceeds across upper wall 24 at an angle a with respect to front side wall 30 until the dispensing slot reaches a position near the rear wall 32 in the region indicated by reference numeral 86. The width of the slot designated by the arrows at reference numeral 88 is selected to have a dimension which is only a fraction (less than one) of the overall width of the storage cavity 49 as indicated by the reference numeral 90 (FIG. 2*b*). Because the slot width 88 is only a fraction of the cavity width 90, it is impossible for the entire stack of bills stored in storage cavity 49 to be removed through the slot 88 at one time. Instead, only a fraction of the total number of bills can be removed at any one time. This provides an important security feature as it prevents a would-be pilferer from grabbing the entire contents of the BDU 20 in one motion. The attendant, however, can easily dispense single bills from the storage compartment 49 by pulling the stack of bills forward by applying finger pressure in the direction shown by arrow 92 (FIG. 2*b*) to the back of the stack of exposed currency 58 in display notch 80 while simultaneously applying upwards pressure in the direction shown by arrow 94 (FIG. 2*a*) against the front surface of the front bill in the currency stack. This action, which can be simulated by rubbing the thumb against the forefinger, will cause a single bill from the currency stacks to smoothly feed through dispensing slot 82. This procedure can be rapidly repeated to dispense multiple bills.

In the preferred embodiment, the BDU 20 includes an additional security feature in the form of a security lip 96 (best seen in FIGS. 1, 2*c* and 3) which extends downwardly from the inner surface of upper wall 24 on the rear side of dispensing slot 82. The security lip 96 serves to trap bills located in the rear portion of the currency stack 58 if an attempt is made to pull multiple bills through slot 82.

When BDUs are being used to support transactions involving a large number of currencies, for example duty-free sales or currency exchange onboard an airliner, a plurality of individual BDUs can be mounted in a special storage drawer having unique characteristics.

Figure 4:
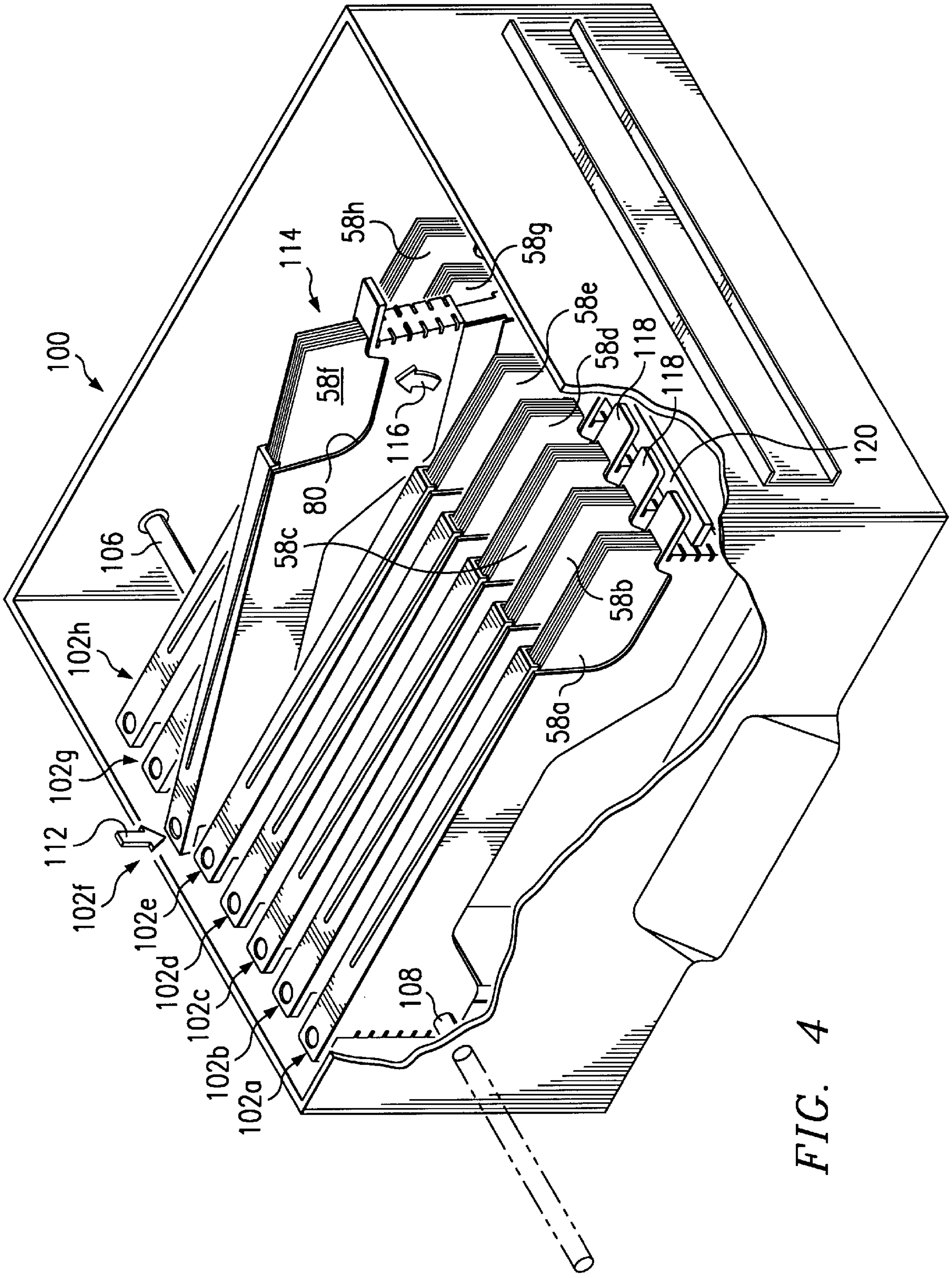
FIG. 4 is a perspective view, with some portions broken away, of several storage and dispensing apparatus mounted in a cash drawer showing one of the apparatus in the raised position to facilitate manual dispensing of the stored bills.

Referring now to FIG. 4, a storage drawer 100 is shown in which a plurality of individual BDUs 102*a*–102*h* are mounted. Each BDU 102*a*–102*h* has been loaded with a quantity of currency 58*a*–58*h*, respectively. Each currency package 58*a*–58*h* can be a different currency, a different denomination or other laminar objects such as checks, tickets, etc. Note that the dispensing units 102*a*–102*h* store currency 58*a*–58*h* in an upright (vertical) position. Vertical storage allows a much greater number of different currency types and denominations to be stored in a storage drawer having a given footprint. A label 104 (FIGS. 1, 2*b* and 3) can be provided on the top of each BDU to identify the contents. The BDUs 102*a*–102*h* operate in a manner identical to those previously described.

In addition to providing increased storage flexibility and enhanced security as described above, the dispensing units 102*a*–102*h* also allow predetermined amounts of currency to be inventoried directly in dispensing units 102*a*–102*h* such that they are ready for immediate loading into a storage drawer 100 without the need for further counting. This can provide quick turn-around when loading of the storage drawer 100 must be accomplished quickly, as between airline flights.

To further increase security and reduce the possibility that an entire dispenser unit 102*a*–102*h* and its contents can be pilfered, the currency drawer 100 can further comprise a retaining mechanism for locking the dispenser units 102*a*–102*h* in the currency drawer 100. Such a locking mechanism can comprise mechanical or electric latches, bolts, pins, and the like. Referring still to FIG. 4, in the preferred embodiment, the retaining mechanism comprises a rod 106 passing through a hole 108 formed in each dispenser unit 102*a*–102*h* and fastened to the rear wall of drawer 100. Thus, the individual dispenser units 102*a*–102*h* can rotate about retaining rod 106, however, they cannot be removed from currency drawer 100 until the retaining rod 106 has been removed by an authorized person. This allows the dispenser units to be quickly and efficiently serviced at a service center by removing drawer 100 and removing rod 106 (as shown in phantom).

In the preferred embodiment, each dispenser unit 102*a*–102*h* further includes an extension 110 positioned horizontally on the opposite side of retaining rod 106 from display notch 80 (in this case, on wall 28). By applying a downward force to extension 110 (shown by arrow 112), the user can cause the entire dispenser unit (in this case, BDU 102*f*) to rotate about retaining rod 106 such that the opposite end 114 will move upwards (as shown by arrow 116). When end wall 114 moves upward, the display notch 80 will also move upward, thereby displaying the exposed corner of currency 58*f* (or other laminar object) in a position where it can be readily accessed by the user for dispensing a portion of the contents.

To support the BDUs, a support extension 118 can be provided near the display notch. The support extension is adapted to rest in a support shelf 120 built in the drawer 100. This prevents unwanted rotation of BDUs 102*a*–102*h* around rod 106.

In addition to bills of individual currency, the dispensing units 102*a*–102*h* can be loaded with prepackaged envelopes containing a preselected assortment of currency or other laminar objects. These prepackaged envelopes or other laminar objects can be stored and dispensed by the dispenser units 102*a*–102*h* exactly like the individual bills of ordinary currency, provided however, that the width of the dispensing slot 82 of the dispensing unit is selected to accommodate the width of the articles to be dispensed.

It will be readily apparent that while the foregoing description described the preferred embodiments of the BDU 20 and of the currency storage drawer 100, many other configurations of such BDU and secure storage drawers are within the scope of the current invention.

We claim:

1. A bill dispensing unit comprising upper, lower, end and side walls defining an internal cavity having upper, lower, end and side surfaces, a display opening formed at an upper corner of said dispensing unit, and a dispensing slot formed through said upper wall of said dispensing unit and joining said internal cavity and said display opening;

said side watts of said dispensing unit being spaced apart to accommodate a pre-selected quantity of laminar objects having similar dimensions and said lower walls and end walls of said dispensing unit being adjustable to position said laminar objects within said internal cavity such that a corner of each said laminar object extends outside said internal cavity into said display opening and the remainder of each said laminar object is inside the interior cavity;

said dispensing slot dimensioned such that only a fraction of said pre-selected quantity of said laminar objects can pass through said dispensing slot at one time to be dispensed from said dispenser unit.

2. A currency storage drawer comprising a plurality of bill dispensing units in accordance with claim 1, wherein said currency storage drawer further comprises a retaining mechanism for locking said bill dispensing units in said currency drawer.

3. A currency storage drawer in accordance with claim 2, wherein said retaining mechanism comprises a rod passing through a passage formed in each said bill dispensing unit and fastening to a rear wall of said currency storage drawer.

4. A currency storage drawer in accordance with claim 3, wherein said drawer is adapted to allow rotation of each of said bill dispensing units about said rod while said bill dispensing units remain fastened on said rod.

5. A currency storage drawer in accordance with claim 4, wherein each of said bill dispensing units rotates about said rod in response to a downward force applied to a portion of said respective bill dispensing unit.

6. An apparatus for storing and dispensing currency notes, said apparatus comprising:

a top member having a top wall, upper end walls, and upper side walls;

a bottom member having a bottom wall, lower end walls, and lower side walls;

a display notch formed at an upper corner of said top member; and a dispensing slot formed through said top wall of said top member and joining said display notch;

said top and bottom members being connected to one another so as to form a generally rectangular storage cavity defined by said top wall, bottom wall, upper end walls, lower end walls, upper side walls and lower side walls thereof;

said storage cavity having dimensions to accommodate a pre-selected quantity of said currency notes therein;

said top and bottom walls having a vertical spacing therebetween such that a corner of each of said currency notes within said storage cavity extends outside said storage cavity into said display notch while the remainder of each of said currency notes remains inside said storage cavity;

said dispensing slot being dimensioned such that only a fraction of said pre-selected quantity of said currency notes can pass through said dispensing slot at one time to be dispensed from said dispenser unit.

7. An apparatus for storing and dispensing currency notes in accordance with claim 6, wherein said display notch has a vertical height of about 1 inch and a horizontal width of about 2 inches.

8. An apparatus for storing and dispensing currency notes in accordance with claim 6, further comprising a side wall insert positioned within said storage cavity adjacent to said upper and lower side walls.

9. An apparatus for storing and dispensing currency notes in accordance with claim 6, wherein said top and bottom members are adapted to adjustably connect to one another such that the vertical spacing between said top and bottom walls can be adjusted.

10. An apparatus for storing and dispensing currency notes in accordance with claim 9, wherein said top member includes a plurality of slots formed on each of said upper end walls, and said bottom member includes at least one prong formed on each of said lower end walls;

each of said prongs being adapted to interfit within one of said slots to connect said top and bottom members.

11. An apparatus for storing and dispensing currency notes in accordance with claim 10, wherein at least one of said lower end walls includes a flexible section which is selectively deformable to allow said prongs to be withdrawn from a first set of said slots and repositioned into a second set of said slots to adjust the spacing between said top and bottom walls.

12. An apparatus for storing and dispensing currency notes in accordance with claim 6, further comprising:

a slider member slidably mounted in said bottom member;

said slider member having a vertical portion extending upward from said bottom member;

said horizontal position of said slider member being adjustable to adjust the horizontal width of said storage cavity.

13. An apparatus for storing and dispensing currency notes in accordance with claim 6, wherein said dispensing slot is oriented at an angle with respect to the outside surface of one of said upper side walls.

14. An apparatus for storing and dispensing currency notes in accordance with claim 6, further comprising a security lip formed on the inner surface of said top wall adjacent said dispensing slot and extending downwardly into said storage cavity.

15. An apparatus for storing and dispensing currency notes in accordance with claim 6, further comprising:

a security hole formed through said top member and adapted to receive a security rod therethrough.

16. An apparatus for storing and dispensing currency notes in accordance with claim 15, wherein said security hole is positioned adjacent to the one of said end walls which is located farthest from said display notch.

17. An apparatus for storing and dispensing currency notes in accordance with claim 16, further comprising:

an extension member formed on said top member;

said extension member positioned on the opposite side of said security hole from said display notch.

* * * * *